US012111520B2

(12) United States Patent
Trottier-Lapointe et al.

(10) Patent No.: US 12,111,520 B2
(45) Date of Patent: Oct. 8, 2024

(54) METHOD AND SYSTEM FOR DETERMINING A LENS OF CUSTOMIZED COLOR

(71) Applicant: ESSILOR INTERNATIONAL, Charenton-le-Pont (FR)

(72) Inventors: William Trottier-Lapointe, Charenton-le-Pont (FR); Jinhhao Ng, Singapore (SG); Jean-Philippe Dumont, Charenton-le-Pont (FR); Haifeng Shan, Dallas, TX (US); Philip Chang, Charenton-le-Pont (FR); Charlène Pousse, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 922 days.

(21) Appl. No.: 17/262,874

(22) PCT Filed: Jul. 30, 2019

(86) PCT No.: PCT/EP2019/070453
§ 371 (c)(1),
(2) Date: Jan. 25, 2021

(87) PCT Pub. No.: WO2020/025595
PCT Pub. Date: Feb. 6, 2020

(65) Prior Publication Data
US 2021/0165248 A1    Jun. 3, 2021

(30) Foreign Application Priority Data
Jul. 31, 2018 (EP) .................................... 18306033

(51) Int. Cl.
G02C 7/10 (2006.01)

(52) U.S. Cl.
CPC ............. *G02C 7/107* (2013.01); *G02C 7/104* (2013.01); *G02C 7/108* (2013.01)

(58) Field of Classification Search
CPC ......... G02C 7/107; G02C 7/104; G02C 7/108
(Continued)

(56) References Cited

U.S. PATENT DOCUMENTS

| 5,402,362 A | * | 3/1995 | Prosser ................... G01J 3/463 356/402 |
| 7,430,316 B2 | | 9/2008 | Boston et al. |
| 2017/0097299 A1 | * | 4/2017 | Arrouy ................... G01J 3/462 |

FOREIGN PATENT DOCUMENTS

| FR | 2711822 A1 * | 5/1995 | ........... G02C 13/003 |
| JP | H08-179104 | 7/1996 | |

(Continued)

OTHER PUBLICATIONS

Office Action issued in corresponding Japanese Application No. 2021503825, dated Apr. 12, 2023.
(Continued)

*Primary Examiner* — James R Greece
(74) *Attorney, Agent, or Firm* — Norton Rose Fulbright US LLP

(57) ABSTRACT

The invention concerns method and system for determining a lens of customized color, said method comprising the steps of determining a target colorimetric data set; providing access to a database comprising data representing colors; using a plurality of simulation modules to calculate, based on said data from the database, a plurality of simulated colorimetric data of the lens substrate combined with a mixture of dyes of determined dye(s) combination, composition and amount or with a multilayer stack as a function of determined layers composition and thicknesses; and, color matching the plurality of simulated colorimetric data with the target colorimetric data set so as to determine one or a (Continued)

plurality of combinations of said lens substrate with a determined mixture of dyes or with a determined multilayer stack.

18 Claims, 4 Drawing Sheets

(58) Field of Classification Search
    USPC ........................................................ 351/159.6
    See application file for complete search history.

(56) References Cited

FOREIGN PATENT DOCUMENTS

| | | |
|---|---|---|
| JP | H11174518 | 7/1999 |
| JP | 2002/063229 | 2/2002 |
| JP | 2006-005159 | 1/2006 |
| JP | 2006264108 A * | 10/2006 |
| JP | 2009/180728 | 8/2009 |
| JP | 2010/501256 | 1/2010 |
| JP | 2014/531058 | 11/2014 |
| JP | 2016/503196 | 2/2016 |
| WO | WO 97/31247 | 8/1997 |
| WO | WO 2015/177447 | 11/2015 |
| WO | WO 2017/070552 | 4/2017 |
| WO | WO 2017/077357 | 5/2017 |
| WO | WO 2017/077358 | 5/2017 |
| WO | WO 2017/077359 | 5/2017 |
| WO | WO 2017/213041 | 12/2017 |
| WO | WO 2018/045040 | 3/2018 |

OTHER PUBLICATIONS

International Search Report and Written Opinion Issued in Corresponding PCT Patent Application No. PCT/EP2019/070453, mailed Sep. 27, 2019.

Larouche & Martinu, "OpenFilters: Open-Source Software for Design, Optimization, and Synthesis of Optical Filters," *Applied Optics*, 47(13): C219-C230, 2008.

* cited by examiner

METHOD AND SYSTEM FOR DETERMINING A LENS OF CUSTOMIZED COLOR

CROSS-REFERENCE TO RELATED APPLICATIONS

This application is a national phase application under 35 U.S.C. § 371 of International Application No. PCT/EP2019/070453 filed Jul. 30, 2019, which claims priority to EP Application No. 18306033.4 filed Jul. 31, 2018, the entire contents of which is specifically incorporated by reference herein without disclaimer.

TECHNICAL FIELD OF THE INVENTION

The invention relates to a method and system for selecting a lens having a customized color.

More precisely the invention relates to a method for determining a lens tint and/or a multi-layer stack having a predetermined color without the need to provide a catalogue with a large set of real samples.

The invention concerns a method for determining quickly a combination of dye mixtures and/or of multi-layer stack enabling to reproduce a color within an extended range of possible colors.

BACKGROUND INFORMATION AND PRIOR ART

Today, eye care professionals (ECP) generally propose to select a color for a solar lens from a catalogue of real samples. However, the number of colors available from a catalogue is limited. A catalogue provides about 20 mirror colors for anti-reflective (AR) coatings and about 20 tinting colors for tinted lenses. Thus, colors from a catalogue do not always match with a target color of an object, such as the lens frame or with a customer-selected color.

Numerous documents describe methods and systems for matching the color of a tinted lens or of an anti-reflective coating to the color of an object or to a selected colorimetric data set.

Patent document JP 2006-005159 relates to a method for determining usage conditions of a coloring material for coloring an article such as a lens in accordance with a color of a sample, by using a dye mixture and evaluating subjectively by visual observation color matching between target and processed samples.

Patent document WO2015/177447 discloses a method for determining color characteristics reflected by an interference filter comprising one mirror layer or a stack of layers over a tinted substrate.

However, these devices and methods generally require many trial and errors for matching a color to a tinted lens and/or a single mirror layer or multi-layer stack. Moreover the calculated solutions are sometimes difficult to manufacture.

Nowadays, many lenses incorporate a technical spectral filter such as a UV-cut filter, NIR-cut filter, blue-cut filter, a therapeutic filter or chrono-cut filter. However, on a clear lens, these technical filters modify the apparent color of the lens. It is often required to combine such a technical filter with another filter so that the resulting lens appears to have another color such as a neutral color for example. This operation is called color balancing.

However, color matching for a lens with a technical spectral filter is even more difficult to achieve because of the spectral filter itself because catalogue of real samples are provided without any additional technical filter.

There is a need to provide ECPs and end-users with a system and method offering to choose among a larger number of colors for tinted lenses and/or for AR layers, these colors being reproducible and manufacturable in industrial conditions.

There is a need for more precise color-matching or color balancing in particular for lenses integrating a technical spectral filter.

There is a need for an automated system enabling to manufacture a lens with a customized color selected by an end-user or ECP among a large number of colors.

SUMMARY OF THE INVENTION

Therefore one object of the invention is to provide a method for determining a lens of customized color comprising the steps of:

determining a target colorimetric data set;

providing access to a database comprising data representing colors, said data comprising colorimetric data corresponding to a plurality of multilayer stacks of determined layers composition and thicknesses and/or said data comprising reflection, transmission, absorption and/or scattering coefficients of a lens substrate and, respectively, of a plurality of dyes, over a range of wavelengths;

using a plurality of simulation modules to calculate, based on said data from the database, a plurality of simulated colorimetric data of the lens substrate combined with a mixture of dyes of determined dye(s) combination, composition and amount or with a multilayer stack as a function of determined layers composition and thicknesses;

color matching the plurality of simulated colorimetric data with the target colorimetric data set so as to determine one or a plurality of combinations of said lens substrate with a determined mixture of dyes or with a determined multilayer stack.

According to an embodiment, the lens substrate further comprises another spectral filter and said method further comprises a color balancing step comprising calculating the simulated colorimetric data of said lens with said another spectral filter.

In a variant, the method further comprises a step of displaying the plurality of simulated colorimetric data and the target colorimetric data set.

According to an embodiment, the plurality of simulation modules comprises a first simulation module adapted to calculate a plurality of simulated colorimetric coordinates in three dimensions for a multi-layer stack as a function of varying thicknesses of said multi-layer stack.

According to another embodiment, the plurality of simulation modules comprises a second simulation module adapted to calculate a simulated reflection spectrum of a tinted lens over a customized background and to match the simulated reflection spectrum of the tinted lens with the target colorimetric data set.

According to still another embodiment, the plurality of simulation modules comprises a third simulation module adapted to calculate simulated absorption spectra for a tinted lens combined with numerical functions representing dyes and to match the simulated absorption spectra of the tinted lens with the target colorimetric data set.

According to still another embodiment, the plurality of simulation modules comprises a fourth simulation module adapted to calculate simulated transmission spectra for a tinted lens combined with numerical dye functions and to match the simulated transmission spectra of the tinted lens with the target colorimetric data set.

More precisely, according to an embodiment of the second simulation module, said target colorimetric data set is determined in reflection, and further comprising the following steps:

selecting a raw lens substrate having determined reflection spectra over a white background and over a black background over the range of wavelengths;

determining a customized background reflection spectrum;

wherein the database contains reflection spectra of the raw lens substrate and of a plurality of dyes for a plurality of concentration Ci of each dye of the plurality of dyes, the database also storing absorption and scattering coefficients of the raw lens substrate and of a plurality of dyes for a plurality of concentration Ci of each dye of the plurality of dyes over said range of wavelengths; and the second simulation module is adapted to use the absorption and scattering coefficients stored in the database for calculating the simulated reflection spectra, for a mixture of n dyes in the lens substrate, each absorption and scattering coefficients of each dye being weighted with a concentration Ci;

the second simulation module being adapted to calculate, from the simulated absorption and scattering coefficients, the simulated reflection spectrum over the customized background reflection spectrum;

the second simulation module being adapted to calculate simulated colorimetric coordinates from the simulated reflection spectrum; and wherein said color matching step comprises calculating a color difference between said target colorimetric data set and said simulated colorimetric coordinates for the mixture of n dyes in the lens substrate and fitting the concentrations Ci of each dye of said mixture of n dyes by minimizing the color difference.

A further object of the invention is to provide a system for determining a lens of customized color comprising an input device for determining a target colorimetric data set, a computer system comprising a database comprising data representing colors and a plurality of simulation modules, wherein said data comprise colorimetric data corresponding to a plurality of multilayer stacks of determined layers composition and thicknesses and/or said data comprising reflection, transmission, absorption and/or scattering coefficients of a lens substrate and, respectively, of a plurality of dyes, over a range of wavelengths, and wherein the plurality of simulation modules is adapted to calculate, based on said data from the database, a plurality of simulated colorimetric data of a lens substrate combined with a mixture of dyes or with a multilayer stack; the plurality of simulation modules being adapted to evaluate a numerical difference between the plurality of simulated colorimetric data and the target colorimetric data set so as to determine one or a plurality of combinations of said lens substrate with a determined mixture of dyes or with a determined multilayer stack matching the target colorimetric data set.

According to an embodiment of said system, the plurality of simulation modules comprises a first simulation module adapted to calculate a plurality of simulated colorimetric coordinates in three dimensions for a multi-layer stack as a function of varying thicknesses of said multi-layer stack.

According to another embodiment of said system, the plurality of simulation modules comprises a second simulation module adapted to calculate simulated absorption and scattering coefficients for a tinted lens as a function of dye mixture composition and to match a simulated reflection spectrum of the tinted lens over a customized background with the target colorimetric data set.

According to still another embodiment of said system, the plurality of simulation modules comprises a third simulation module adapted to calculate simulated absorption spectra for a tinted lens as a function of numerical dye functions and to match the simulated absorption spectra of the tinted lens with the target colorimetric data set According to still another embodiment of said system, the plurality of simulation modules comprises a fourth simulation module adapted to calculate simulated transmission spectra for a tinted lens as a function of numerical dye functions and to match the simulated transmission spectra of the tinted lens with the target colorimetric data set.

Preferably, the computer system is connected to a deposition apparatus for depositing said multilayer thin film stack on said lens substrate and the computer system being connected to an apparatus for dyeing lenses.

According to a particular aspect, the computer system is connected to a display device adapted to display rendered colors for said one or a plurality of combinations of said lens substrate with a determined mixture of dyes and/or with a determined multilayer stack.

The invention also concerns a business method using the method and system according to the appended claims for ordering a lens of determined color.

BRIEF DESCRIPTION OF THE DRAWING(S)

Figure 3:
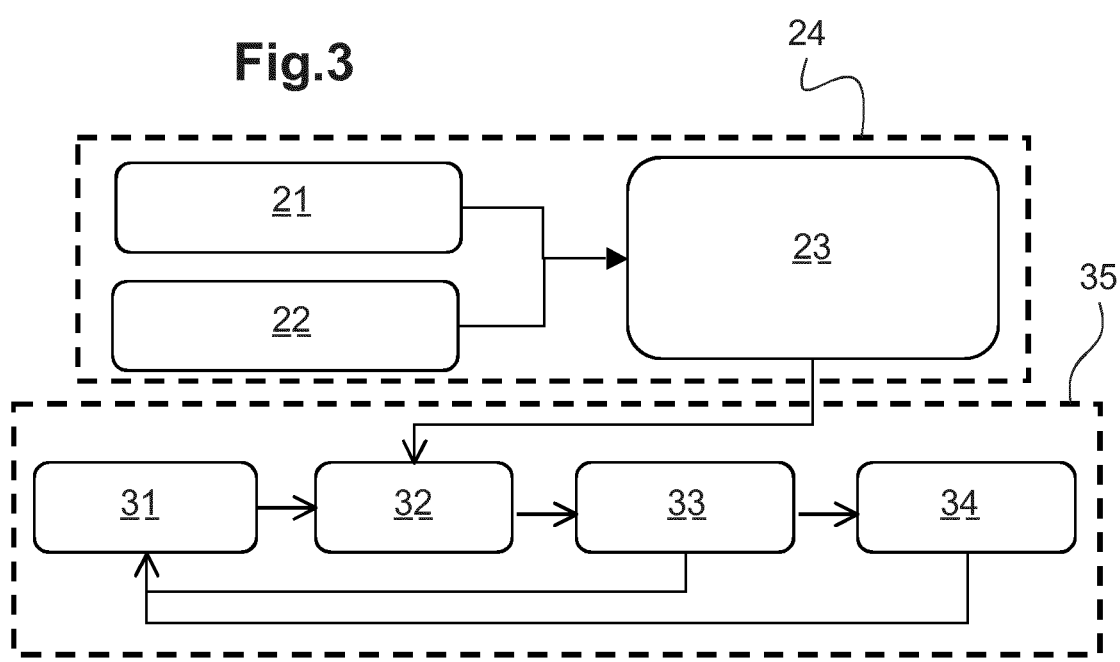
Figure 4:
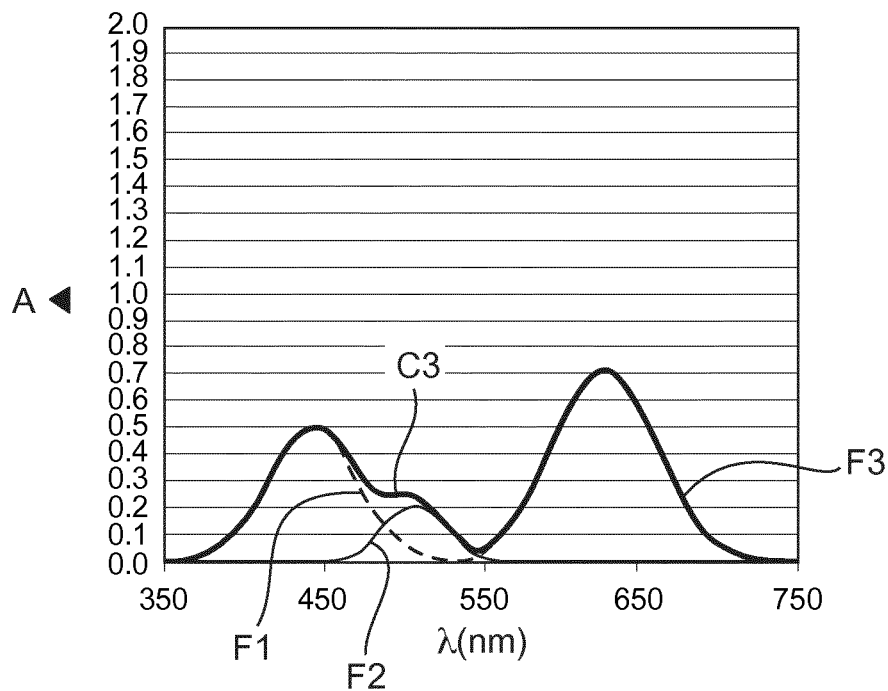
Figure 5:
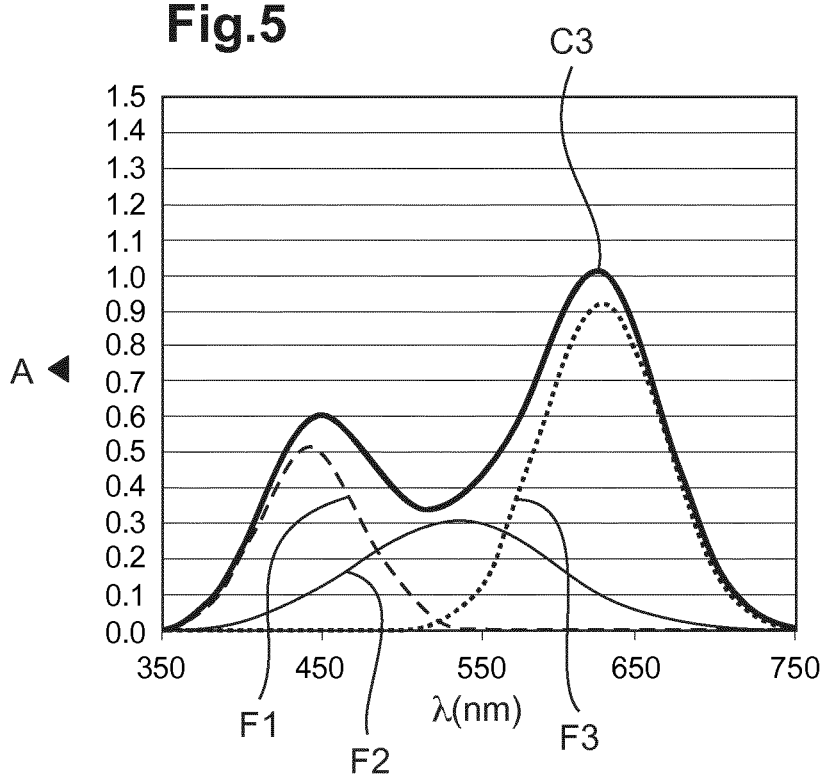
Figure 6:
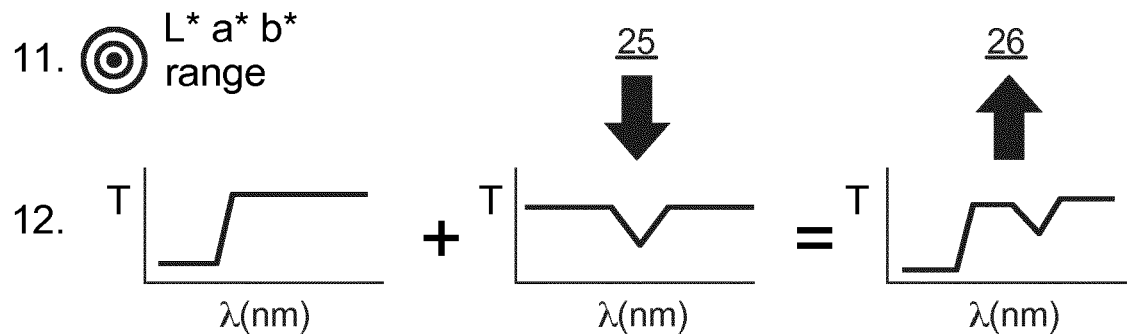
Figure 7:
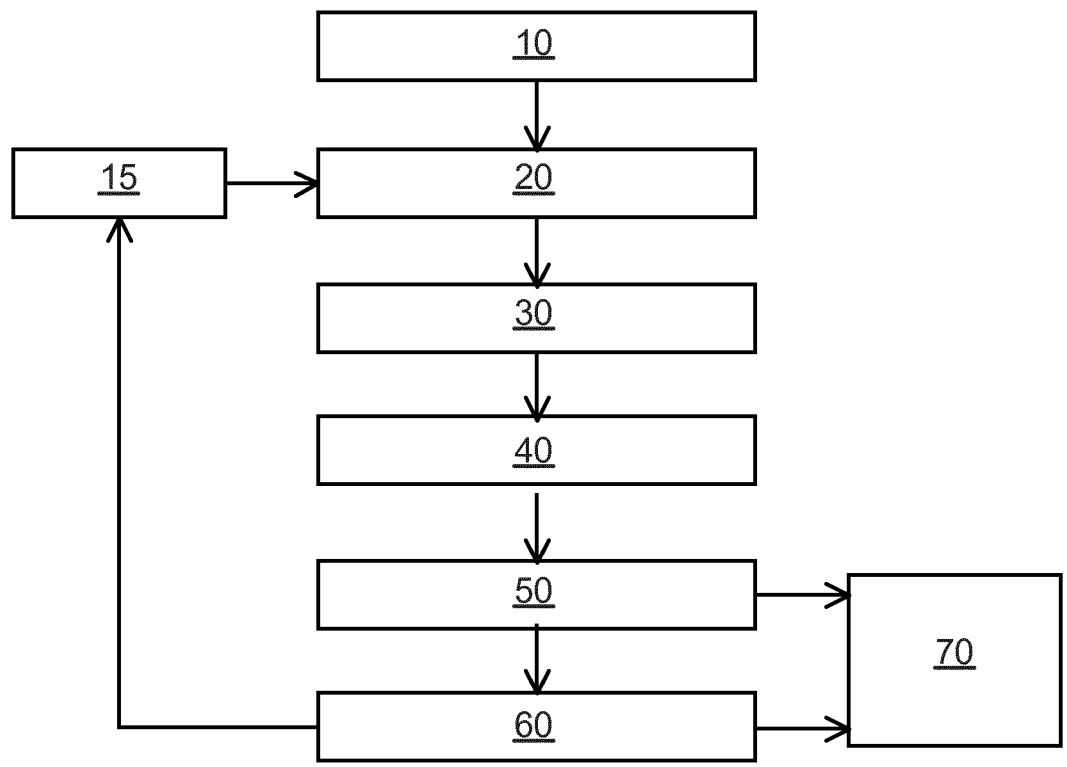

FIG. 3 schematically shows the processing steps of a second simulation module calculating reflection spectra over a customized background for tinted lenses of varying dye compositions;

FIGS. 4-5 show an example of a third simulation module providing numerical simulations of absorption spectra for a combination of dyes;

FIG. 6 schematically shows the processing steps of a fourth simulation module providing numerical simulation of colorimetric data set in transmission for a tinted lens as a function of the lens and dye transmission spectrum;

FIG. 7 schematically shows possible uses of a system combining a database and a plurality of simulation modules for determining a lens of customized color.

DETAILED DESCRIPTION OF EXAMPLE(S)

Although different color-matching methods exist, up to now, each method is used independently. This implies that the end-user first decides the type of technology for manufacturing the lens (tinted or mirror lens), before selecting the optimum lens color. Also, selecting the right dyes for producing the filters depends heavily on the expertise and experience of the operators and the variety of dyes available. The higher the numbers of dyes to chose from, the more difficult it is to select the most suitable set of dyes for producing the filters. This narrows considerably the range of available colors. Moreover, it is generally not possible to compare colors available using different colour-matching methods. Furthermore, the combination of tint and mirror can have an adverse effect on the transmission of the final product and can render the result unattractive, undesirable or incompatible with international ophthalmic normative regulations.

The present disclosure relies on the constitution and use of a system comprising a database, or a combination of databases, a plurality of simulation modules for colour-matching or colour balancing and a common visualization and selection module.

More precisely, the database comprises data representing colors and corresponding to an extensive number of tinted lenses and/or AR stacks. The data representing colors generally comprise colorimetric data corresponding to a plurality of multilayer stacks of determined layers composition and thicknesses and/or said data comprise reflection, transmission, absorption and/or scattering coefficients of a lens substrate and, respectively, of a plurality of dyes, over a range of wavelengths. The database aggregates for example millions of possible color data sets, each color data set corresponding to a tinted lens of determined dye(s) combination, composition and amount and/or to a multilayer stack of determined layers composition and thicknesses, and each tinted lens and/or AR stack in the database being individually manufacturable. In the present disclosure, the term data representing colors may be expressed in colorimetric data set, defined in CIE standard (Commission Internationale de l'Eclairage), or in terms of reflection, transmission, absorption and/or scattering spectra. The data representing colors may be converted from colorimetric data set into reflection, transmission, absorption and/or scattering spectra using commonly known formula respectively for tinted lenses and for multi-layer stacks. The data representing colors may also comprise optical properties of materials such as refractive index and absorption coefficients over a range of wavelengths.

The present disclosure proposes to use a plurality of numerical simulation modules to calculate large numbers of available colors in transmission and/or in reflection, for tinted lens and/or AR layer(s). The simulated colors and the corresponding tinted lens composition and/or AR layer composition and thicknesses are stored or easily deduced from the database. Each simulation module comprises a colour-matching sub-module which determines among the simulated colors possible structure(s) for tinted lens or and/or multi-layer composition having a target color or within a range of target colors.

Within the present disclosure, the terms first, second, third and fourth simulation module imply no order among the various simulation modules.

The database and the simulation modules are preferably connected to the same display device so as to enable visual comparison in rendered colors of the various solutions proposed in each module.

Then, the ECP and end-user can use the common visualization and selection module of the system so as to choose the final target color and determine quickly the corresponding tinted lens and/or lens with multi-layer stack to be manufactured.

The specificity of this system is to rely not only on a single physical or mathematical model applied to only one type of lens (tinted or with multi-layer stack), but instead to rely on a plurality of models (at least 2) evaluating different color matching criteria in reflection, in transmission or both and applying to different technologies for manufacturing tinted and/or mirror lenses. The integration of various simulation models provides a larger set of possible solutions to the end-user, each solution being manufacturable. The possible solutions are easily compared to each other before manufacturing.

The present disclosure first details various numerical simulation modules. We then detail exemplary uses of the system and method according to the present disclosure.

More precisely, we herein disclose in detailed manner four numerical simulation modules. However, the system may rely on 2, 3 or more than four numerical simulation modules, as will be apparent to those skilled in the art.

A first exemplary simulation module is based on a physical and numerical model to simulate possible colors in reflection (C, h°, Rv) or (L*, a*, b*) for a specific mirror or AR stack.

The ECP or end-user determines target colorimetric values expressed in CIE color coordinates (L*, a*, b*) or (C, h°, Rv) or in a book of colors (e.g. Munsell book of colors). In an example, the GUI allows for a color selection on the screen so that it is more intuitive than selecting numbers. Screen selection is then converted into color coordinates such as the ones mentioned above. The color matching step is based for example on minimizing a color difference between the target colorimetric values and the available colors in the database.

For example the interface could allow for a color selection on the screen which would then be converted into color coordinates mentioned above.

The numerical model relies on a multi-layer dielectric stack. However, the numerical model can also be used to simulate a single layer, for example a mirror thin film of aluminium or chromium. The numerical model can also be used to simulate a stack of two dielectric layers. However, considering the limited number of available dielectric layers, the two-layers stack provides only for a limited range of available colors such as a few green, blue and silver colors.

The following detailed example is based on a stack of 4 dielectric layers. More than 4 layers, such as 5 or 6 or more layer stacks can also be simulated in a similar manner, with typical examples of anti reflective stacks having between 3 to 12 dielectric layers.

More precisely, the numerical simulation module calculates reflection spectra of a multilayer stack of dielectric layers for a plurality of layer thicknesses and/or composition.

First, the available materials to be used for manufacturing a multi-layer dielectric stack are selected. For example, the dielectric materials are chosen among, but not limited to: zirconium dioxide ($ZrO_2$), silicon dioxide ($SiO_2$), titanium oxide ($TiO_2$), niobium oxide ($Nb_2O_5$), tantalum oxide ($Ta_2O_5$), vanadium oxide ($V_2O_5$), silicon nitride ($Si_3N_4$), magnesium fluoride ($MgF_2$), tungsten oxide ($WO_3$), nickel oxide (NiO), indium tin oxide (ITO), tin oxide ($SnO_2$) and SiOCH hybrid. Pre-selection for stacks can also be based on the mechanical and chemical durability of the pre-selected materials.

The numerical model uses air as outer medium, a reference substrate with a fixed refractive index of 1.5 or 1.6 and the refractive indices of the selected materials as a function of wavelength.

Figure 1:
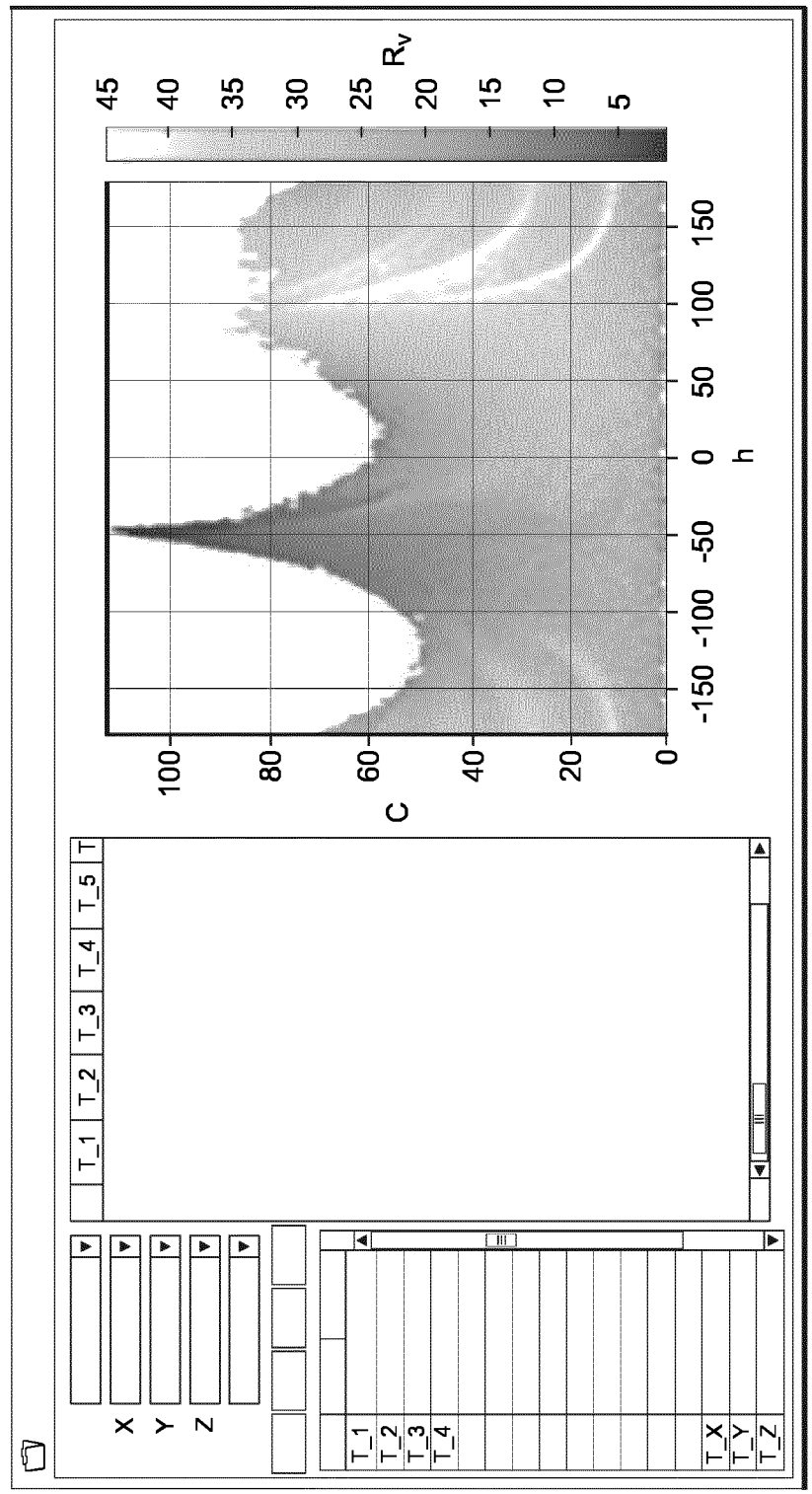
FIG. 1 shows an example of a first simulation module providing 3D color simulation in reflection for a stack of 4 dielectric layers of varying thicknesses, with hue angle (h) in horizontal axis, chroma (C) in vertical axis on the left and Rv in vertical scale on the right.
Figure 2:
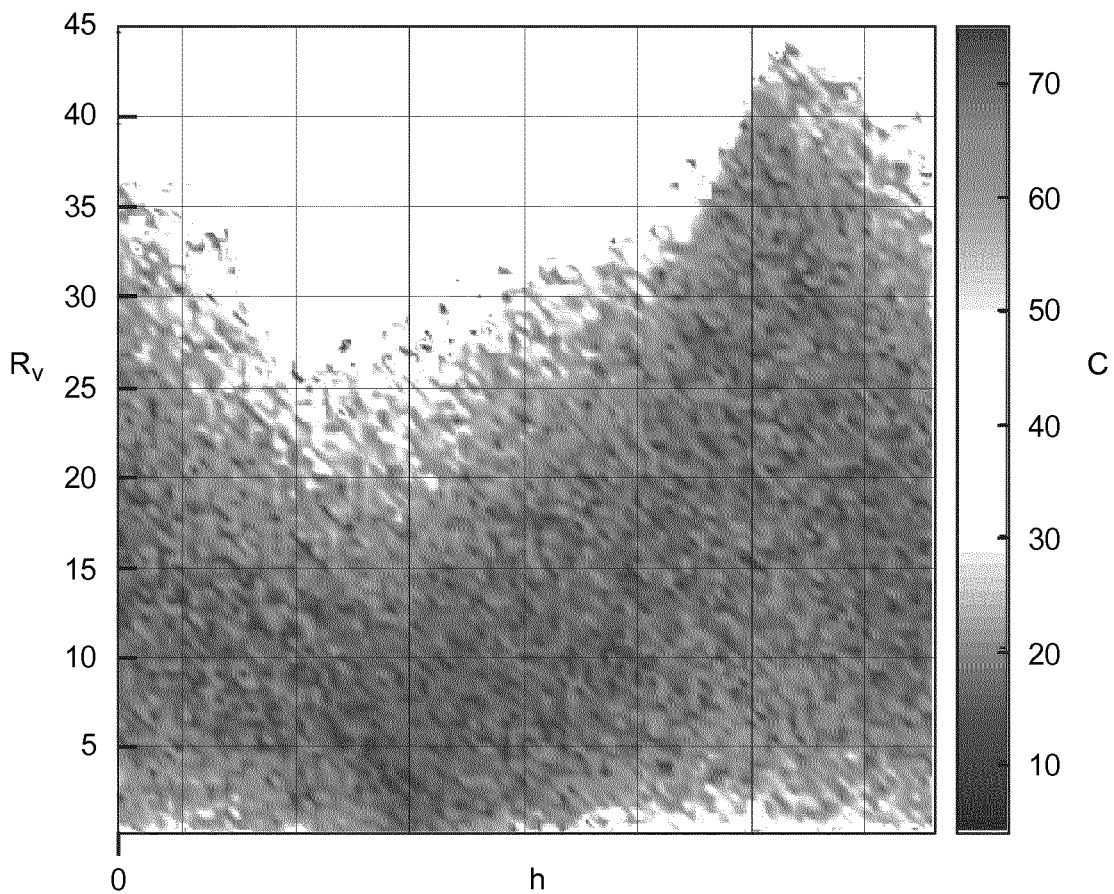
FIG. 2 shows the same data as FIG. 1, and shows 3D color simulation in reflection for a stack of 4 dielectric layers of varying thicknesses with hue angle (h) in horizontal axis, Rv in vertical axis on the left and chroma (C) in vertical scale on the right.

In an example illustrated on FIGS. 1 and 2, a four-layer model on the reference substrate is used. The 4-layer stack comprises a first layer of silicon dioxide, a second layer of zirconium dioxide, a third layer of silicon dioxide and a fourth layer of zirconium dioxide. In summary, the 4 layer structure is air/SiO$_2$/ZrO$_2$/SiO$_2$/ZrO$_2$/reference substrate.

A conventional numerical model is used for calculating reflection spectra, transmission spectra and colorimetric data as a function of variable layers thicknesses (for example in S. Larouche and L. Martinu "OpenFilters: open-source software for the design, optimization and synthesis of optical filters", Applied Optics, Vol. 47, no 13, C219-C230, 2008).

In the example of FIG. 1-2, multiple stacks are randomly selected, with each layer having a thickness chosen randomly from 20 to 250 nm such as described by the Monte Carlo method, thus resulting in about 1 million of possible combinations. It is also possible to vary the thicknesses by a predetermined step or to combine these two approaches.

For each combination of layer thickness for the above 4-layer stack, the numerical model calculates the corresponding color coordinates in reflection and/or in transmission. The simulated color coordinates are expressed or converted into a set of colorimetric coordinates (Rv, C, h). Each layer thickness is varied one by one and the corresponding new colorimetric coordinates are calculated.

It is to be noted that in this specific example, there is no absorption since all the layers are dielectric and at the thicknesses involved, the absorption is negligible. Therefore, the total of transmission plus reflection always is 100% or, in other words, Rv=100%−Tv. Thus, values in transmission are easily deduced from values in reflection. One can apply this correction to the targeted transmission in order to combine multiple modules together. In the case where the preselected materials comprise absorbing materials, the database includes their absorption coefficients and the numerical simulation module also calculates transmission and reflection spectra, but the sum of reflection and transmission is not 100% due to the absorption. The same correction can then be applied on transmission for the calculated transmission of the coating.

The possible combinations of 4 layers of varying thicknesses enable to simulate millions of results expressed in colorimetric data. The results of these numerous simulations are represented in colorimetric coordinates in 3-dimensions shown in FIG. 1 or 2.

On FIG. 1, the horizontal axis represents the hue angle, noted h, the vertical axis on the left represents chroma, noted C and the vertical scale on the right represents the luminosity of the color based on the human eye sensitivity, noted Rv (from CIE 1931 and D65 illuminant). FIG. 2 shows the same data resulting from the same 4-layer structure with the same thickness variations but represented with different axis. On FIG. 2, the horizontal axis also represents the hue angle, h, but the vertical axis on the left represents the luminosity of the color based on the human eye sensitivity, Rv and the vertical scale on the right represents the chroma, C (the higher the more saturation of color meaning that 0 is grey and 50 is very saturated).

The three most important color parameters (h, C, Rv) are therefore shown here in one graph (FIG. 1 or FIG. 2). The results of these simulations provide all the possible 3D colorimetric coordinates available for the 4-layer stack of determined composition and variable thicknesses. The results are stored in the database. This database therefore contains a 3D color space limited by the possible Rv, C and hue angles. The database may then contain millions of possible sets of colorimetric data. This example of a 4-layer stack of determined thickness ranges is given for illustrative purposes only.

The database can contain colorimetric coordinates in 3D for 4-layer stack consisting of other materials and/or other thickness ranges. The database can further contain color data in 3D for N-layer stack, where N is an integer for example N=3, 5, 6, . . . , 12 or more layers consisting of the same or other materials and/or other thickness ranges.

The end-user selects a target set of colorimetric coordinates defined preferably in (Rv, C, h) or a range of colorimetric coordinates either directly or by selecting a specific color on the screen which is then transformed into color coordinates or by indicating a color to match on an image on the screen.

For color matching, a request in the database returns all the possible layer stack structures and layers thicknesses having colorimetric coordinates corresponding to the target set or range of colorimetric coordinates.

The request may return no solution, a single solution or multiple solutions corresponding to the same target color data set or within the same predefined range of target color data.

For example, the color difference (delta E) known in the art is used for color matching so as to select the stacks having color data close to the target color. This may require a conversion of the (Rv, C, h) coordinates into (L, a, b) coordinates. The target color difference (delta E) must be lower than a predetermined numerical threshold, for example delta E that is less than 10, preferably less than 3.

For example, using the 4-layer structure simulated on FIGS. 1 and 2, a red color target corresponds to a target chroma between 60 and 61, a hue angle of 0±1.5° and a Rv of 10±2. By using the simulated data, the following 4-layer stacks are deduced and summarized in the following Table I:

| | T1 | T2 | T3 | T4 | Rv | C | hue |
|---|---|---|---|---|---|---|---|
| solution1 | 229 | 229 | 120.7 | 243.6 | 9.58 | 60.85 | −1 |
| solution2 | 240.42 | 77.5 | 135 | 230.83 | 8.5 | 60.68 | −0.49 |
| solution3 | 225.7 | 95.1 | 119.2 | 234.4 | 8.34 | 60.62 | −0.33 |
| Solution4 | 230 | 91.2 | 122.8 | 233.5 | 8.3 | 60.56 | 0.26 |
| Solution5 | 221.25 | 230.83 | 115.83 | 240.42 | 11.7 | 60.41 | 0.9 |
| Solution6 | 230.83 | 230.83 | 115.83 | 240.42 | 10.23 | 60.06 | 1.36 |
| Solution7 | 232.7 | 225.2 | 115.7 | 244.1 | 10.64 | 60.68 | 1.47 | where T1 represents the thickness of the first layer of SiO$_2$ closest to the air, T2 the thickness of the second layer of ZrO$_2$, T3 the thickness of the third layer of SiO$_2$ and T4 the thickness of the fourth layer of ZrO$_2$ that is closest to the substrate.

In this case, 7 possible AR stacks of 4-layers are manufacturable to obtain the targeted red color. Selection among the 7 possible solutions may be based on another selection criteria, for example based the highest Q/Z ratio representing the highest ratio of total thickness of silicon dioxide over the total thickness of zirconium dioxide, which would be solution2 in this case with a ratio of 1.22. Other selection criteria may be based on mechanical conditions such as the lowest number of layers, the lowest total thickness or the thickness of particular layers or a predetermined amount of reflection, or specific reflections or cuts involved by some of the stacks.

Other target colorimetric data combined with the database of 4-layers materials and thickness ranges may result in no possible 4-layer structure, in a single 4-layer structure or in multiple possible AR stacks having the target color in reflection.

Thus, this first simulation module, combined with a database of 3D colorimetric data simulation, provides quick determination of the possible multi-layer dielectric structure (s) enabling to obtain a target color or range of colors.

For more accurate color balancing, the numerical model of this first simulation module may take into account more precisely the refractive index and absorption coefficient of the substrate instead of using a reference substrate. In particular, for a lens with a technical filter such as a UV-cut, blue-cut, the absorption wavelength, bandwidth and/or cut-off wavelength of the substrate is integrated into the numerical model. For example, the database includes values calculated for the colors usually identified as good blue, bad blue, infrared and scotopic filters. The values of the selected technical filter are specified at the beginning of the calculation process and are integrated in the simulation module for every multi-layer stack calculated. Values are given in transmission and in reflection. Values can also be given for back reflectance which can be different from front reflectance in the case where there is absorption.

The first simulation module is connected to a display device so as to display the possible solutions for multi-layer stacks. Optionally, the first simulation module includes a sub-module for simulating the rendered color in reflection and in transmission for each proposed solution. Thus the end-user may select a customized solution from the proposed solutions. In a variant, after visualizing the proposed solutions, a colour balancing step may be executed in order to fine tune the color of a proposed multi-layer stack.

In an embodiment, the first simulation module is connected to a deposition system for depositing layers on a lens substrate. After selection of the appropriate multi-layer stack, the first simulation module transmits a stack of n layers that is selected and the thickness for each layer. The deposition system then manufactures the corresponding AR stack by depositing the layers one by one on the lens substrate. In an embodiment, the first simulation module may generate the database described above.

An exemplary second simulation module is used to determine a mixture of dyes for tinting a lens so as to obtain the target color in reflection over a determined background.

More precisely, the second simulation module is based on a software for simulating absorption and scattering coefficients of a dyed lens using a diffused reflectance Kubelka-Munk model and based on measurement of a customized background (for example the end-user's skin) reflection spectrum. In this case, the ECP and/or end-user determines a colour-to-replicate or target color as seen in reflection, the target color being defined by a set of colorimetric coordinates for example (L*, a*, b*) or (L*, C, h) or in a book of colors (e.g. Munsell book of colors). The color matching step is based on minimizing a difference between simulated reflectance spectra (using also a diffused reflectance Kubelka-Munk model) of a tinted lens over the background and the reflectance spectrum of the target color, so as to determine an optimum dye mixture composition having the same color in reflection over a customized background (for example skin).

FIG. 3 schematically shows the main sub-modules or steps of the second simulation module.

First, available dyes and raw substrate are preselected. These dyes are preferably commercially available dyes for tinting lenses, such as Hunstmann dyes, Exciton dyes, BASF dyes or Epolin dyes.

More precisely, step 21 comprises determining reflection spectra respectively of the raw substrate without dye (in other words corresponding to a null concentration C=0) over a black background and over a white background, and of the substrate with each individual dye at different concentrations each measured over the black background and over the white background. These reflection spectra may be previously stored in a database 24. Alternatively, the reflection spectra are measured using a spectrometer in the visible range $[\lambda_1;\lambda_2]$, with $\lambda_1\sim380$ nm and $\lambda_2\sim780$ nm. The spectrometer may be used to measure the reflection spectra for both the substrate and each dye in the substrate by measuring reflectance spectra in the visible range.

Step 22 comprises determining reflection spectra of the black background, the white background and preferably of at least another coloured background, for example a customized background such as the skin of the end-user. The background reflection spectra may be previously stored in the database 24. Alternatively, the background reflection spectra are measured using a spectrometer in the visible range.

Step 23 comprises using a numerical simulation module, by transposing and adapting a model based on Kubelka-Munk theory for turbid media to the field of optical devices, and in particular to tinted lenses, in order to calculate the absorption coefficients (K) and scattering coefficients (S) for the lens substrate without dye (equivalent to null concentration) and for the lens substrate with each individual dye at different concentrations. The absorption coefficients (K) and scattering coefficients (S) are calculated at each wavelength in the visible range for example between 380 nm and 780 nm by steps of 1 nm. Each of these absorption coefficients (K) and scattering coefficients (S) is calculated respectively over the black background, the white background and the customized coloured background.

The reflection spectra determined at steps 21 and 22 and, respectively, the absorption coefficients (K) and scattering coefficients (S) calculated at step 23, are stored in the database 24.

At step 31, a dye mixture is determined with a set of relative concentrations $C_i$ for each dye.

The database 24 is then used, at step 32, to calculate the absorption coefficients (K) and scattering coefficients (S) for the lens substrate with the dye mixture determined at step 31 over the customized background.

For example, a fitting method is used to define, for each wavelength in the visible range, a numerical function representing the absorption coefficient K(C) of a dye as a function of its concentration C. Similarly, a fitting method is used to define, for each wavelength in the visible range, a numerical function representing the scattering coefficient S(C) of a dye as a function of its concentration C.

For each wavelength, the absorption coefficient K of the lens with a dye mixture is equal to the sum of the absorption coefficient of the substrate $k_{substrate}$, and the sum of the absorption coefficients $k_i(C_i)$ of each dye at its concentration $C_i$:

$$K=k_{substrate}+\Sigma k_i(C_i)$$

Similarly, for each wavelength, the scattering coefficient S of the lens with a dye mixture is equal to the sum of the scattering coefficient of the substrate $S_{substrate}$, and the sum of the scattering coefficients $S_i(C_i)$ of each dye at its concentration $C_i$:

$$S=S_{substrate}+\Sigma S_i(C_i)$$

At step 32, reflection spectra are calculated from the absorption coefficients (K) and scattering coefficients (S) for the substrate with various dye mixtures at various concentrations over the customized background.

More generally, the second simulation module enables to simulate the reflection spectrum of a mixture of dyes over each background (black, white, customized background).

Then, at step 33, the reflection spectrum of the colour-to-replicate is calculated based on the target set of colorimetric coordinates. The reflection spectrum of the colour-to-replicate is numerically compared to the reflection spectrum for the lens substrate with a dye mixture, calculated at step 32. A minimization function is calculated, and a recursive algorithm repeating steps 31, 32 and 33 is applied by varying the dyes concentrations $C_i$ at step 31, so as to fit the reflection spectrum of the colour-to-replicate with the simulated reflection spectrum of the lens substrate and dye mixture over the customized background.

At step 34, the colorimetric data set (L*a*b*) or (L*C h) corresponding to the reflection spectrum of the dye mixture is calculated. A color difference, ΔE or Delta E, is calculated between the target colorimetric coordinates of the colour-to-replicate and the colorimetric data set of the lens with dye mixture over the customized background. Several calculation are available for calculating a color difference: DeltaE*, Delta E CMC, Delta E 94 or Delta E 2000, as known by those skilled in the art.

Another recursive algorithm, repeating steps 31 to 34, is applied by finely adjusting the dye concentrations $C_i$ at step 31, so as to fit the colorimetric data set of the lens with dye mixture over the customized background with the target colorimetric coordinates of the colour-to-replicate. The output of this recursive algorithm determines the relative concentrations $C_i$ for a set of n dyes.

Steps 31-34 are calculated using a simulation module which is interfaced with the database 24.

In summary, this second simulation module provides quick determination of the possible dye mixture(s) enabling to obtain a target color in reflection and taking into account the reflection from the customized background. Thus, the result obtained provides more precise color-matching for a tinted lens as seen in reflection when worn by the end-user.

The parameters of number of dyes and pre-selected dyes are easily changed, for example depending on the available dyes at a manufacturing site.

It should be noted that this second simulation module takes into account any technical filter already integrated into the lens substrate by measuring the real reflection spectrum of a lens substrate including this technical filter.

Moreover, this second simulation module enables to simulate the rendered color of the lens with dye mixture before manufacturing.

To that end, the second simulation module is connected to a display device so as to display the possible solutions for tinted lens. The second simulation module preferably includes a sub-module for simulating the rendered color in reflection and in transmission for each proposed solution. Thus the end-user may select a customized solution from the proposed solutions.

In an embodiment, the second simulation module is connected to an apparatus for dyeing lenses. After selection of the appropriate dye mixture, the second simulation module transmits the selected set of n dyes and the relative concentrations $C_i$ for each dye. The apparatus for dyeing lenses then manufactures the corresponding lens.

A third exemplary simulation module is based on the use of mathematically simulated absorption spectra of dye mixtures.

In this case, the target color is defined in colorimetric coordinates (L, a*, b*). The target colorimetric coordinates (L, a*, b*) are converted into a target absorption spectrum using CIE standard formula and using Beer-Lambert's law, assuming null reflection. For example the target colorimetric coordinates are: L=77.0; a*=−3.9 and b*=−1.9 with an overall transmission T of 52.1%.

Contrary to the second simulation module, the database used for the third simulation module does not rely on measured spectra of real dyes, but instead uses mathematic functions representing each dye. For example, each dye is simulated by a Gaussian shaped filter having a determined maximum absorption wavelength ($\lambda_{MAX}$), maximum absorption ($A_{max}$) and full-width at half maximum (FWHM). The absorption spectrum of a dye mixture is simulated by the sum of the absorbance spectra of each dye weighted by the relative concentration of each dye, assuming null reflection.

FIG. 4 schematically shows an example of initial guess of simulated absorption spectra for three Gaussian functions, respectively F1, F2, F3, representing three dyes and a combined spectrum, C3, corresponding to the sum of the three mathematical functions representing a dye mixture.

The initial guess of dye mixture illustrated on FIG. 4 is defined in the following table II:

|  | F1 | F2 | F3 |
|---|---|---|---|
| $\lambda_{MAX}$ (nm) | 450 | 520 | 650 |
| Absorp. ($A_{max}$) | 0.50 | 0.20 | 0.30 |
| Sigma | 30.00 | 20.00 | 35.00 |
| FWHM | 71 | 47 | 82 |

The use of mathematical functions representing the dyes enables to use conventional algorithms, such as for example an excel solver based on ascent/descent functions, for the color-matching step.

FIG. 5 schematically shows an example of result calculation of simulated absorption spectra for the three optimized mathematical functions, F1, F2, F3, and the corresponding combined spectrum, C3, corresponding to the sum of the three mathematical functions representing a dye mixture enabling to obtain the target colorimetric data defined above.

The optimized dye mixture illustrated on FIG. 5 is defined in the following table III:

|  | F1 | F2 | F3 |
|---|---|---|---|
| $\lambda_{MAX}$ (nm) | 480 | 580 | 650 |
| Absorp. ($A_{max}$) | 0.50 | 0.30 | 0.80 |
| Sigma | 30.00 | 30.00 | 20.00 |
| FWHM | 71 | 71 | 47 |

More precisely, the colour-matching step uses minimization criteria based on a difference between the absorption spectrum of the target color and the simulated absorption spectrum of a dye mixture. By adjusting the absorption peak wavelengths ($\lambda_{MAX}$) and absorption widths (FWHM) of each dye in the mixture, this third simulation module enables to determine one or several optimum dye mixture composition (s) having the same color in transmission or absorption as the target colour-to-replicate. In an option, a final iteration based on a minimization criteria defined by a color difference ΔE between the target colorimetric data and the simulated colorimetric data for the combined filters enables a final color-matching adjustment. Results are obtained very quickly, for example in less than one hour.

In an embodiment, the third simulation module is connected to an apparatus for dyeing lenses, for example the same as connected to the second simulation module. After selection of the appropriate dye mixture, the third simulation module transmits a set of n dyes that is selected and the relative concentrations $C_i$ for each dye. The dyes available at the manufacturing site are selected based on the results of the simulation and color-matching. This third simulation module enables to select the dyes having the closest spectra compared to the Gaussian shapes of the simulation, at the time of manufacturing. This enables the operator to select easily the most suitable combination of dyes to produce the filter. The apparatus for dyeing lenses then manufactures the corresponding lens.

Alternatively, instead of a mathematical function simulating a dye, the spectrum of a real dye may be used to simulate a combined lens and dye absorption spectrum. The real dye may correspond to a technical filter such as a colour-filter for example a blue-cut filter which makes the lens appear yellow or green.

This method applies to clear lenses as well to dark lenses.

Moreover, this third simulation module enables to perform a color balancing step. To that end, the minimization criteria incorporates the transmission of the tinted lens as seen by human eye T %. For example a minimum transmission value is set at 75%. The corresponding hue angles which are compatible with such a transmission determine a range of hue angles comprised for example between 80 degrees and 140 degrees.

The simulated transmission spectrum and the measured transmission spectrum of a test sample based on color balancing using the third method are in excellent agreement.

This third simulation module enables to propose tinted lenses in many more colors than predefined colors in a catalogue.

A fourth exemplary simulation module is based on the use of a transmission spectrum of the substrate, mathematically simulated transmission spectra (for example with Gaussian shape) of a dye and a Monte-Carlo algorithm based on Beer-Lambert's law to simulate transmission spectra of a dye with different absorption wavelength and strength, a color matching step based on minimizing color difference between transmission spectra, and extraction of colorimetric values (L*a*b*) from simulated transmission spectra to determine the best dye wavelength and strength enabling a predefined range of colorimetric values. The mathematical calculation enables more precise determination of dye, with a better color matching.

FIG. 6 schematically shows the processing steps of a fourth simulation module providing numerical simulation of colorimetric data set in transmission for a tinted lens as a function of the lens and dye transmission spectra. This fourth simulation module is more particularly directed to the color balancing step so as to determine quickly an optimum transmission spectrum with respect to a target.

At step 11, a target range of colors is defined in colorimetric data (L*a*b*).

At step 12, the input transmission spectrum of the substrate, for example including a UV filter, is selected.

At step 25, a processor simulates transmission spectrum of a dye using a mathematical function, for example with a Gaussian shape having a determined maximum absorption wavelength ($\lambda_{MAX}$), maximum absorption ($A_{max}$) and full-width at half maximum (FWHM). Such a mathematical function may represent for example a bandpass filter or a notch filter. Other mathematical functions are contemplated without departing from the present disclosure.

At step 26, the processor calculates the combined transmission spectrum of the input substrate with the simulated dye function.

At a further step, the processor calculates the simulated colorimetric coordinates (L*a*b*) of the combined substrate and simulated dye function. The processor evaluates a color difference between the simulated colorimetric coordinates (L*a*b*) and the target colorimetric range. If the simulated colorimetric coordinates (L*a*b*) are not within the target colorimetric range, the maximum absorption wavelength ($\lambda_{MAX}$), maximum absorption ($A_{max}$) or full-width at half maximum (FWHM) of the dye are modified and the processor runs a new iteration starting at step 25. Iteration is stopped when the simulated colorimetric coordinates (L*a*b*) of the lens substrate with dye function are within the target colorimetric data range and the results are stored in the database.

More precisely, the simulation of the absorption or transmission spectrum, assuming null reflection, is used for color-balancing. An algorithm for example based on a conventional Monte-Carlo simulation enables to fit the simulated transmission spectrum of the lens substrate with dye as a function of the target colorimetric values (L*a*b*). This fourth simulation module enables very precise determination of the optimum dye parameters. For example, the maximum absorption wavelength ($\lambda_{MAX}$) is determined with an accuracy of a nanometer or few nanometers.

The optimum dye filter parameters enables to choose the best dye commercially available or at the manufacturing site. Since real dyes are liable to degrade as a function of time and/or exposure to ambient temperature variations, real dye absorption properties may vary with respect to their specifications. By selecting the appropriate dye corresponding to the best simulation at the time of manufacturing, the present disclosure enables to achieve a closer colour-matching than when relying on commercial dye specifications.

Optionally, for a clear lens, the fourth simulation method comprises a final adjustment of the transmission. A minimisation criteria based on transmission, or on luminous transmission ($\tau_v$), for example setting a minimum transmission, either with or without anti-reflective stack depending on the case, at 80% or at 90%, is applied to fine tune the dye features.

In an embodiment, the fourth simulation module is connected to an apparatus for dyeing lenses, for example the same as connected to the second and/or third simulation modules. After selection of the appropriate dye, the fourth simulation module transmits the selected dye and the concentration to the apparatus for dyeing lenses.

Those skilled in the art would adapt easily the fourth simulation module for a mixture of dyes.

In summary, if used alone, none of the simulation modules enables to simulate all the optical properties for any type of solar lens including a dye or dye mixture or a multi-layer stack. However, each simulation module enables precise colour-matching of color data in reflection, absorption and/or transmission either for tinted lenses or for AR stacks.

Thus, the various simulation modules provide complementary solutions to the technical problem of color matching for solar lenses or for lenses with or without a technical filter.

The various simulation modules (at least two, and in the examples detailed above four or even more simulation modules) are integrated in a same computer system and use a same database and generally a same display device.

FIG. 7 schematically shows possible uses of the system incorporating the various simulation modules described above.

At step 10, the end-user determines a target color, eventually with the help of an ECP.

In an example, the end-user has a physical object, for example a lens frame, either opaque or transparent. A spectrometer may be used to measure the reflection or transmission spectrum of the object. Alternatively, a spectrocolorimeter is used to capture the reflectance spectrum, optionally with a background for a non opaque object. Alternatively, a colorimeter is used to capture the colorimetric coordinates (L*a*b*).

In another example, the end-user has no physical object, but defines directly the target colorimetric values (L*a*b*) or a range of target colorimetric values (L*a*b*), for example by identifying the colorimetric values on a screen or by identifying a color on a screen, the colorimetric values being attached to the color.

As an option, the end-user may also consult a catalogue of predefined lens colors, such as a pantone, as a starting point for color matching or color balancing.

At steps 20-40, the processor runs the various simulation modules and calculates all the possible solutions with each of the simulation module.

At step 20, for each simulation module, the processor simulates colorimetric data, reflection, absorption and/or transmission spectra for a substrate combined with a dye or dye mixture or a multi-layer stack.

More precisely, at step 20, using the first simulation module, the processor calculates 3D colorimetric data in three dimensions for a 4-layer stack of variable thicknesses.

Using the second simulation module, at step 20, the processor calculates reflection spectrum for a lens with a dye mixture over a customized background.

And, using the third or fourth simulation module, at step 20, the processor calculates the absorption or transmission spectrum of a dye or dye mixture combined with a lens substrate.

At step 30, for each simulation module, the processor performs a color-matching between the simulated and target data.

More precisely, at step 30, using the first simulation module, the processor calculates and minimizes a color difference between the target colorimetric values and the simulated colorimetric data in 3D so as determine the possible multi-layer stack(s).

Using the second simulation module, at step 30, the processor calculates and minimizes a reflection spectrum difference between the simulated reflection spectrum for a lens with a dye mixture over a customized background and a target reflection spectrum, and further the processor calculates and then minimizes a color difference between the target colorimetric values and the simulated colorimetric values.

Using the third or, respectively, fourth simulation module, at step 20, the processor calculates and minimizes a difference between the simulated absorption spectrum or, respectively, transmission spectrum of a dye or dye mixture combined with a lens substrate and the target absorption spectrum or, respectively, transmission spectrum.

At step 40, the processor determines all the possible sets of lenses with a multi-layer or with a dye or dye mixture having a color that matches the target color defined at step 10 resulting from executing the various simulation tools.

At step 50, the processor simulates and displays the rendered colour, in reflection, transmission or both, for each of the possible sets of lenses determined at step 40.

At step 70, the end-user selects one lens among the possible sets of lenses. In an embodiment, the corresponding lens is ordered and manufactured at the end of step 70.

After step 50, if the determined possible sets of lenses are unsatisfying, for example because they do not integrate a technical filter in the lens, a color balancing step is applied at step 60.

The color balancing step is provided using several of the simulation modules. As a result of step 60, the processor provides colour-balanced possible sets of lenses.

If the end-user selects one lens among the colour-balanced possible sets of lenses, the process resumes to step 70. If no lens is proposed at the end of step 50 or 60 or if the end-user is unsatisfied with the proposed possible sets of lenses, the process resumes to step 20, by changing the values of the variable parameters, by modifying the fitting criteria or by modifying the target color or color range.

Optionally, the process includes an additional step 15 which defines additional technical features for the lens, for example including a blue-cut filter.

The integration of various simulation modules combined with a same database increases the number of possible colors for tinted lenses or lenses with multi-layer stack. Most of these colors can not be reached using any one of the simulation modules used independently.

In an embodiment, the first simulation device proposes a range colorimetric values available for an antireflective stack having a designed technical feature, for example rear-face UV protection, blue cut, Rv performances, angles of reflections . . . etc. The process may include further colorimetric shifts induced, either in transmission or reflection by other technical functions of the lens, such as substrate innate absorption or other technical features commonly used by those skilled in the art. The process may then re-calculate one or more set of target colorimetric values for the effect of the dye which take into account the antireflective available colorimetric values and the optional colorimetric shifts. The process may then run the steps 20 to 70 mentioned above for the second, third or fourth simulations and propose a plurality of set of lenses, one for each of the colorimetric values for the antireflective stack selected within the above-mentioned range. The process may filter some colorimetric values for the antireflective stack selected within the above-mentioned range or some set of lenses based on an internal calculation.

In an embodiment, a fully automated system for ordering lenses is connected to various manufacturing tools for manufacturing tinted lenses or lenses with multi-layer stack having a color on demand. This fully automated system is capable of handling millions of different colours.

The invention claimed is:

1. A method for determining a lens of customized color comprising the steps of:
    determining a target colorimetric data set;
    providing access to a database comprising data representing colors, said data comprising colorimetric data corresponding to a plurality of multilayer stacks of determined layers composition and thicknesses and said data comprising reflection, transmission, absorption and/or scattering coefficients of a lens substrate and, respectively, of a plurality of dyes, over a range of wavelengths;

using a plurality of simulation modules to calculate, based on said data from the database, a plurality of simulated colorimetric data, wherein the plurality of simulation modules comprises a first simulation module adapted to calculate a first plurality of simulated colorimetric data for a multi-layer stack on said lens substrate as a function of determined layers composition and thicknesses and wherein the plurality of simulation modules comprises at least another simulation module adapted to calculate another plurality of simulated colorimetric data comprising a plurality of simulated reflection, transmission or absorption spectra of the lens substrate combined with a mixture of dyes as a function of varying determined dye(s) combination, composition and amount;

color matching the plurality of simulated colorimetric data with the target colorimetric data set so as to determine a plurality of combinations, said plurality of combinations comprising at least one combination of said lens substrate with a determined mixture of dyes and at least another combination of said lens substrate with a determined multilayer stack;

on a same display device, displaying rendered colors in reflection and transmission for each of said plurality of combination so as to enable their visual comparison in rendered colors.

2. The method of claim 1, wherein the lens substrate further comprises another spectral filter and wherein said method further comprises a color balancing step comprising calculating the simulated colorimetric data of said lens with said another spectral filter.

3. The method of claim 1, further comprising a step of displaying the plurality of simulated colorimetric data and the target colorimetric data set.

4. The method of claim 1, wherein the first simulation module is adapted to calculate a plurality of simulated colorimetric coordinates in three dimensions for a multi-layer stack as a function of varying thicknesses of said multi-layer stack.

5. The method of claim 1, wherein the at least another simulation module comprises a second simulation module adapted to calculate a simulated reflection spectrum of a tinted lens over a customized background and to match the simulated reflection spectrum of the tinted lens with the target colorimetric data set.

6. The method of claim 5, wherein said target colorimetric data set is determined in reflection, and further comprising the following steps:

selecting a raw lens substrate having determined reflection spectra over a white background and over a black background over the range of wavelengths;

determining a customized background reflection spectrum;

wherein the database contains reflection spectra of the raw lens substrate and of a plurality of dyes for a plurality of concentration $C_i$ of each dye of the plurality of dyes, the database also storing absorption and scattering coefficients of the raw lens substrate and of a plurality of dyes for a plurality of concentration $C_i$ of each dye of the plurality of dyes over said range of wavelengths; and the second simulation module being adapted to use the absorption and scattering coefficients stored in the database for calculating the simulated reflection spectra, for a mixture of n dyes in the lens substrate, each absorption and scattering coefficients of each dye being weighted with a concentration $C_i$;

the second simulation module being adapted to calculate, from the simulated absorption and scattering coefficients, the simulated reflection spectrum over the customized background reflection spectrum;

the second simulation module being adapted to calculate simulated colorimetric coordinates from the simulated reflection spectrum; and wherein said color matching step comprises calculating a color difference between said target colorimetric data set and said simulated colorimetric coordinates for the mixture of n dyes in the lens substrate and fitting the concentrations $C_i$ of each dye of said mixture of n dyes by minimizing the color difference.

7. The method of claim 1, wherein the at least another simulation module comprises a third simulation module adapted to calculate simulated absorption spectra for a tinted lens combined with numerical functions representing dyes and to match the simulated absorption spectra of the tinted lens with the target colorimetric data set.

8. The method of claim 1, wherein the at least another simulation module comprises a fourth simulation module adapted to calculate simulated transmission spectra for a tinted lens combined with numerical dye functions and to match the simulated transmission spectra of the tinted lens with the target colorimetric data set.

9. A system for determining a lens of customized color comprising:

an input device for determining a target colorimetric data set;

a computer system comprising a database comprising data representing colors; and a plurality of simulation modules, wherein said data comprise:

colorimetric data corresponding to a plurality of multilayer stacks of determined layers composition and thicknesses and said data comprising reflection, transmission, absorption and/or scattering coefficients of a lens substrate and, respectively, of a plurality of dyes, over a range of wavelengths, and wherein the plurality of simulation modules comprises a first simulation module adapted to calculate, based on said data from the database, a first plurality of simulated colorimetric data of a lens substrate combined with a mixture of dyes with a multilayer stack as a function of determined layers composition and thicknesses and wherein the plurality of simulation modules comprises at least another simulation module adapted to calculate another plurality of simulated colorimetric data comprising a plurality of simulated reflection, transmission or absorption spectra of the lens substrate combined with a mixture of dyes as a function of varying determined dye(s) combination, composition and amount; the plurality of simulation modules being adapted to evaluate a numerical difference between the first plurality of simulated colorimetric data and the target colorimetric data set and respectively between the another plurality of simulated colorimetric data and the target colorimetric data set so as to determine a plurality of combinations, said plurality of combinations comprising at least one combination of said lens substrate with a determined multilayer stack and at least another combination of said lens substrate with a determined mixture of dyes, the plurality of combinations matching the target colorimetric data set, and wherein the computer system is connected to a display device adapted to display rendered colors in reflection and transmission for each of said plurality of combinations so as to enable visual comparison in rendered colors.

10. The system of claim 9, wherein first simulation module is adapted to calculate a plurality of simulated colorimetric coordinates in three dimensions for a multi-layer stack as a function of varying thicknesses of said multi-layer stack.

11. The system of claim 10, wherein the at least another simulation module comprises a second simulation module adapted to calculate simulated absorption and scattering coefficients for a tinted lens as a function of dye mixture composition and to match a simulated reflection spectrum of the tinted lens over a customized background with the target colorimetric data set.

12. The system of claim 10, wherein the computer system is connected to a deposition apparatus for depositing said multilayer thin film stack on said lens substrate and the computer system being connected to an apparatus for dyeing lenses.

13. The system of claim 9, wherein the at least another simulation module comprises a second simulation module adapted to calculate simulated absorption and scattering coefficients for a tinted lens as a function of dye mixture composition and to match a simulated reflection spectrum of the tinted lens over a customized background with the target colorimetric data set.

14. The system of claim 12, wherein the at least another simulation module comprises a third simulation module adapted to calculate simulated absorption spectra for a tinted lens as a function of numerical dye functions and to match the simulated absorption spectra of the tinted lens with the target colorimetric data set.

15. The system of claim 9, wherein the at least another simulation module comprises a third simulation module adapted to calculate simulated absorption spectra for a tinted lens as a function of numerical dye functions and to match the simulated absorption spectra of the tinted lens with the target colorimetric data set.

16. The system of claim 13, wherein the at least another simulation module comprises a fourth simulation module adapted to calculate simulated transmission spectra for a tinted lens as a function of numerical dye functions and to match the simulated transmission spectra of the tinted lens with the target colorimetric data set.

17. The system of claim 9, wherein the at least another simulation module comprises a fourth simulation module adapted to calculate simulated transmission spectra for a tinted lens as a function of numerical dye functions and to match the simulated transmission spectra of the tinted lens with the target colorimetric data set.

18. The system of claim 9, wherein the computer system is connected to a deposition apparatus for depositing said multilayer thin film stack on said lens substrate and the computer system being connected to an apparatus for dyeing lenses.

* * * * *